UNITED STATES PATENT OFFICE.

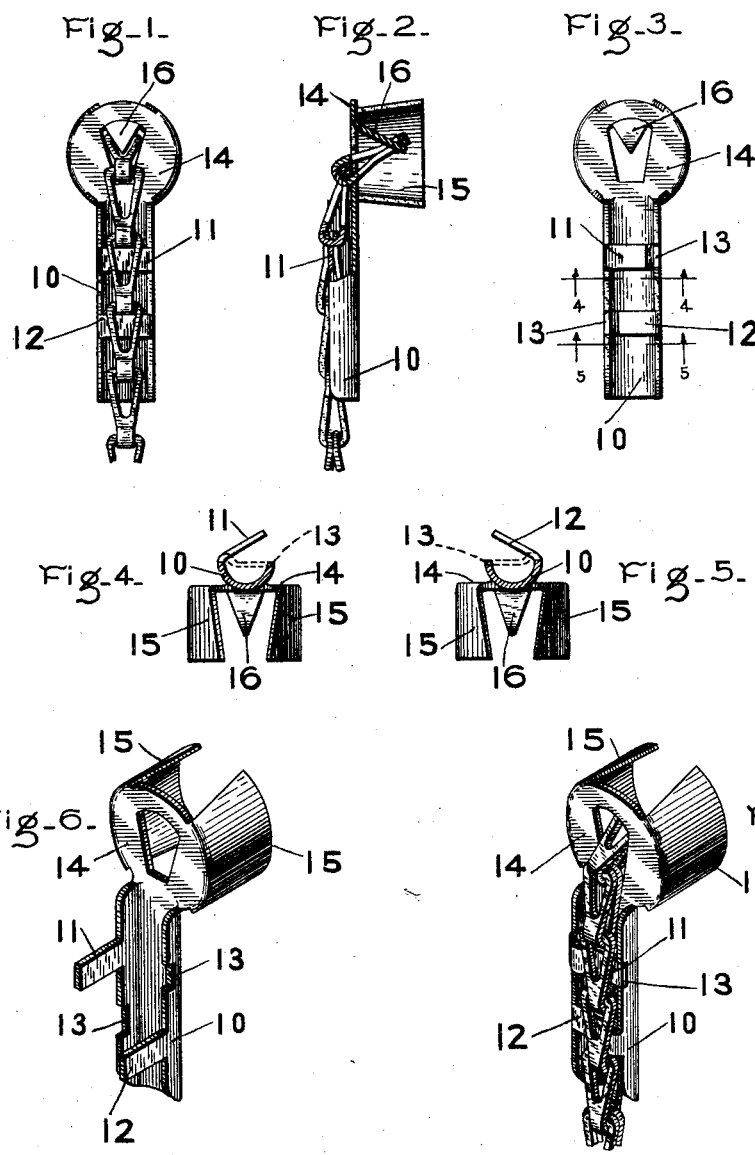

MICHAEL RAUGHTIGAN, OF NORWICH, CONNECTICUT.

SASH-CHAIN FASTENER.

1,056,710.  Specification of Letters Patent.  Patented Mar. 18, 1913.

Application filed November 8, 1912. Serial No. 730,186.

*To all whom it may concern:*

Be it known that I, MICHAEL RAUGHTIGAN, a citizen of the United States, and a resident of Norwich, in the county of New London and State of Connecticut, have invented certain new and useful Improvements in Sash-Chain Fasteners, of which the following is a specification, reference being had to the accompanying drawings.

The object of this invention is to provide simple, strong and cheap means for attaching the weight-supporting chain to the window sash, and it is also my purpose to provide a form of fastener that may be readily re-arranged upon the chain, if necessary, or desirable, in order to lengthen or shorten the chain connection.

My said invention is clearly illustrated in the annexed drawings, Figure 1 being an outer face elevation of a fastening device embodying my present improvement and showing the chain properly connected therewith. Fig. 2 is a side view of the same parts; the fastening device being partly broken away to disclose the means for supporting the end link of the chain. Fig. 3 is an outer face view of the said fastener, as it appears when made ready to receive the chain. Fig. 4 is a transverse sectional view taken on the line 4—4 of Fig. 3, and Fig. 5 is a similar view taken on the line 5—5 of the said Fig. 3. Fig. 6 is a perspective view of the fastener as it appears before the tongues 11—12 have been partially folded down, as in Fig. 3. Fig. 7 is a perspective view of the fastener and chain, as they appear when assembled, and ready for use.

Referring to these drawings the numeral 10 indicates a semi-tubular body having its opposite edge portions formed with tongues 11—12 that are offset from each other and are of such length that they (the tongues) may extend to the opposite edge of the body and find a seat in a notch or depression 13 in said body, as is perhaps best illustrated in Fig. 7 of the annexed drawings. The said body portion is first swaged into the form illustrated in Fig. 6 and the tongues 11 and 12 are then temporarily folded down as in Fig. 3; that is to say, so as to leave sufficient space between the end of the tongue and the body to allow a chain link to be slipped over the end of the tongue, before said tongue is finally bent down into its coöperating notch 13.

The head of the fastener is formed integral with the described body and consists, as here shown, of a disk 14 having a struck-up rim portion 15 that is adapted to fit snugly in a corresponding depression in the edge of a sash, and the mid-portion of said disk is punched and bent inwardly, to provide a spur 16; the opening in said disk being of such size and shape that the first link of the chain may be inserted therein and hooked over the said spur 16, as seen in Fig. 2 of the drawings.

In the operation of assembling the fastener and chain, the first link is entered in the opening in the disk, and slipped over the spur 16, as I have just described. The chain is then swung to one side; that is to say, out of alinement with the body 10, until the link that is adjacent to tongue 10 can be slipped over said tongue. The chain is thus swung to the opposite side until the next link of the chain can be slipped over the tongue 12, when the said chain is adjusted until it alines with the body 10 and the tongues are then bent down into their respective notches 13. When the parts are thus assembled they are so securely connected that they cannot be separated by ordinary usage but, if it should be desired to lengthen or shorten the chain it may be readily accomplished by springing up the free end portions of the tongues 11 and 12 until the links may be removed from them, when the chain links may be re-arranged on said tongues and upon the spurs 16. The tongues 11—12 are then bent down into their respective notches and the device is again ready for service. Importance is attached to the presence of the notches for without them I have found that the prongs are easily bent by the sudden jerks brought upon them as the window is raised or lowered quickly; but with the prongs engaged in these notches it is practically impossible to dislodge the prongs or bend them even though the window be thrown up or down very suddenly.

I do not intend, or wish, in this application for a patent to claim broadly the use of the rim-portions 14, as I have prepared another application for a patent in which I have illustrated, described and claimed that feature of novelty with more particularity.

What I claim to be new and wish now to secure by Letters Patent is:—

As an improved article of manufacture, a sash chain fastener comprising a head portion adapted to engage a sash and a body portion extending therefrom and formed with alternately oppositely disposed coöperating tongues and notches, the head being provided with an inclined spur extending within the same to engage a link of the chain.

MICHAEL RAUGHTIGAN.

Witnesses:
 FRANK C. PALMER,
 FRANK H. ALLEN.

Copies of this patent may be obtained for five cents each, by addressing the "Commissioner of Patents, Washington, D. C."